J. WILKINSON.
Cooling-Dairy.
No. 159,055. Patented Jan. 26, 1875.
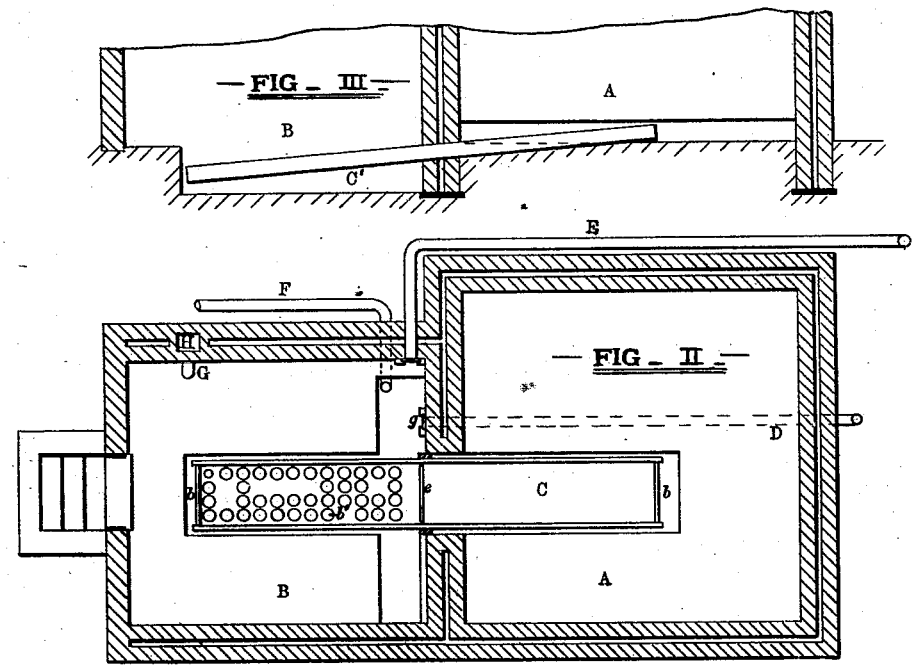
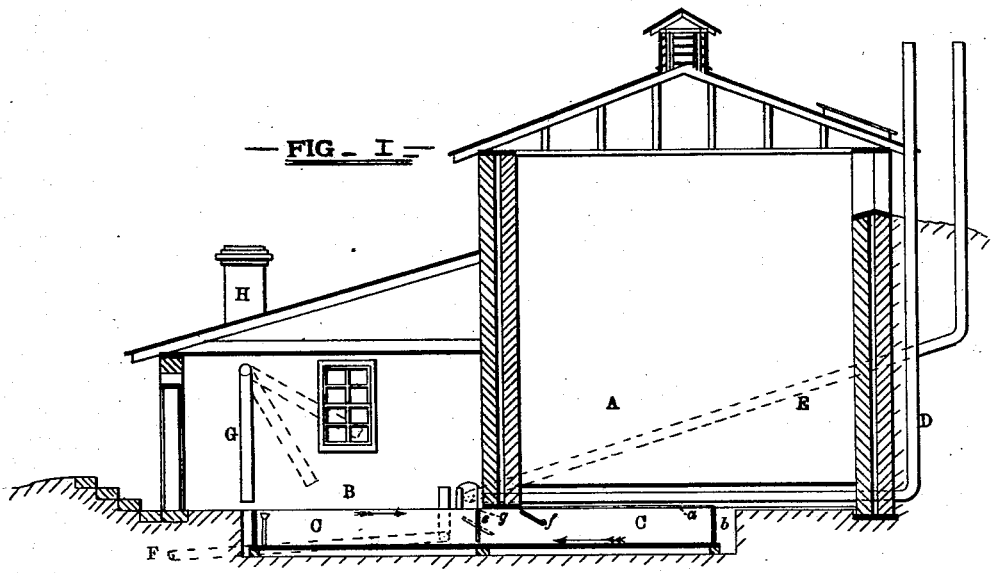
WITNESSES
Frank Coover
W. W. Wharton
INVENTOR
John Wilkinson
by G. H. & W. T. Howard
attys.

UNITED STATES PATENT OFFICE.

JOHN WILKINSON, OF BALTIMORE, MARYLAND.

IMPROVEMENT IN COOLING-DAIRIES.

Specification forming part of Letters Patent No. 159,055, dated January 26, 1875; application filed September 4, 1874.

*To all whom it may concern:*

Be it known that I, JOHN WILKINSON, of the city of Baltimore and State of Maryland, have invented certain Improvements in Dairies, of which the following is a specification; and I do hereby declare that in the same is contained a full, clear, and exact description of my said invention, reference being had to the accompanying drawing, and to the letters of reference marked thereon.

My invention relates, first, to the cooling of milk and dairy products by means of a circulating current of water confined within a sink, one end of which occupies a position in an ice-house, and the other end a similar position in a dairy-room, the velocity of the said current, when unrestrained, being controlled by the relative temperatures of the ice-house and dairy, the said sink containing devices for governing or restraining the activity and extent of the circulating current to regulate the temperature of the milk, and others to prevent the equalizing of the temperatures of the ice-house and dairy by the passage of air over the surface of the water in the sink, as it varies in depth under circumstances hereinafter described. My invention relates, secondly, to a method of ventilating the dairy-room by means of mechanism hereinafter fully set forth.

In the further description of my invention which follows, due reference must be had to the accompanying drawing, in which—

Figure 1 is a longitudinal section of an ice-house and dairy, showing my improvements; and Fig. 2, a sectional plan of the same.

Similar letters of reference indicate similar parts of the invention in both figures.

A represents the ice-house, and B the dairy. C is a sink, one portion of which is located in the ice-house, where it is protected by a cover, $a$, from the entrance to the sink of sawdust and other matter, and placed in a vat, $b$, in the floor of the dairy. The vat is larger than the sink to admit of an air-space around it for obvious purposes. For the better understanding of the application of a circulating current of water to the cooling of milk, as embraced in my present invention, I refer to Letters Patent No. 150,644, granted to me May 5, 1874, in which patent the principle of circulating fluids is fully described, as well as the advantages arising therefrom. The velocity of the circulating current in the sink C varies with the heat of the milk to be frigerated and the temperature of the dairy-room, and may be more rapid than is required to maintain the necessary temperature of the milk in the cans $b$. To check the rapidity of circulation and rate of conduction of heat from the milk, I use a winged valve, $e$, adapted to be operated by means of a lever in the dairy-room. The opening in the partition-wall above the sink is occupied by a suspended floating valve, $f$, the lower edge of which rests upon the surface of the water to prevent any circulation of air between the ice-house and diary, as the depth of the water is lessened by the removal of one or more of the milk-cans. The valve $f$ is packed at the sides by means of strips of flexible material attached thereto, which bear against the sides of the sink. The water from the melting ice passes into the sink C, and thus forms its supply, the low temperature of the inflowing water being thus utilized. Water from the sink is carried off through an overflow.

In Fig. 3 a pipe, C′, is shown, extending from the ice-house, and below the floor thereof, to a sink in the floor of the dairy-room. The pipe C′, which is sealed at the ends, and nearly filled with water, may be either inclined, as shown, or laid in a horizontal position. By this arrangement the sink is cooled by a circulating current of water in the pipe, similar to the current in the sink shown in Figs. 1 and 2.

The ventilation of the dairy-room is accomplished by means of a system of pipes or ducts in conjunction with a flue or chimney, as follows: D is a pipe provided with a stop-valve, $g$, commencing in the dairy-room near the partition-wall, passing through the same, and under the floor of the ice-house, and thence vertically at the back of the wall to a point above the roof of the ice-house. Another pipe, E, laid in the ground below solar influence, extends from the dairy, in an ascending line, to a point, say, one hundred feet from the building, at which point it rises vertically to a height corresponding to that of pipe D. F is another subterranean duct leading from the dairy-room to the outer air at some distance from the dairy in a descending line. G represents an adjustable egress-pipe, the upper end of which passes into the flue or chimney H. The connection at $h$ is of such character as to admit of the pipe G being placed and secured at any desired angle, two of the angular positions being shown by dotted lines. The pipe D, with the pipe G in any of its positions, forms an inverted siphon, the dairy-room supplying the connection between them, or constituting a continuation of one to the other. The air which passes down the long leg of the siphon, which is the pipe D, and issues out of the pipe G and chimney H, which represents the short leg, is cooled in its passage under the ice-house floor. This method of ventilating and cooling the dairy-room is thoroughly effective, but is only used when the milk is at a high temperature. The other methods, and those generally employed, are the pipe E, used in connection with the pipe G, and the pipe E in conjunction with the duct F, which has, at the inner end thereof, a pipe similar to G, but reversed in position. The duct F, which is inclined from the dairy, is used either as a mode of ingress or egress, as the relative temperatures of the outer air and air in the dairy-room differ. When the air in the dairy-room is to be maintained at a temperature lower than the exterior atmosphere, the duct becomes a medium of egress; but when the relative temperatures of the dairy-room and exterior atmosphere are reversed, it becomes an ingress-duct, and is the medium of air-supply for the dairy. When the egress-pipe G is used, either in connection with the pipes D or E, the atmosphere in the dairy can be cooled to an altitude governed by the angular position of said egress-pipe, and a shallow stratum of cool air maintained at the floor, while all above it is suitable for human occupancy. All the pipes, both ingress and egress, are supplied with regulating-valves.

The advantages of a circulating current of water over that supplied by a spring are numerous, among which may be mentioned the extent and facility with which the temperature of the water may be definitely increased or diminished to suit the peculiar requirements of the milk in its different conditions, and the freedom from danger of freezing in severe weather. The thorough manner in which the dairy is ventilated and the temperature regulated at all seasons of the year renders its hygienic condition all that can be desired.

Having thus described my invention, what I claim as new, and desire to secure by Letters Patent of the United States, is—

1. In an ice-house and dairy placed contiguously, the sink C, in combination with the valves $e$ and $f$, substantially as and for the purposes specified.

2. The system of air pipes or ducts represented by D E F G, relatively arranged substantially as and for the purposes set forth.

In testimony whereof, I have hereunto subscribed my name this 1st day of September, in the year of our Lord 1874.

J. WILKINSON.

Witnesses:
W. S. WILKINSON,
JAS. HENDERSON.